US008427062B2

(12) United States Patent
Bertram et al.

(10) Patent No.: US 8,427,062 B2
(45) Date of Patent: Apr. 23, 2013

(54) ILLUMINATION DEVICE AND METHOD FOR ADAPTING AN EMISSION CHARACTERISTIC OF AN ILLUMINATION DEVICE

(75) Inventors: Ralph Peter Bertram, Nittendorf (DE); Wolfgang Pabst, Deisenhofen (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 1083 days.

(21) Appl. No.: 12/230,360

(22) Filed: Aug. 28, 2008

(65) Prior Publication Data

US 2009/0058307 A1 Mar. 5, 2009

(30) Foreign Application Priority Data

Aug. 29, 2007 (DE) ......................... 10 2007 040 873

(51) Int. Cl.

| | |
|---|---|
| ***H05B 37/02*** | (2006.01) |
| ***H05B 39/04*** | (2006.01) |
| ***H05B 41/36*** | (2006.01) |
| ***H05B 37/04*** | (2006.01) |
| ***H05B 41/16*** | (2006.01) |
| ***G05F 1/00*** | (2006.01) |
| *G01J 1/32* | (2006.01) |
| *G21G 4/00* | (2006.01) |

(52) U.S. Cl.
USPC ........... 315/157; 315/149; 315/291; 250/205; 250/493.1

(58) Field of Classification Search ......................... None
See application file for complete search history.

(56) References Cited

U.S. PATENT DOCUMENTS

| | | | | |
|---|---|---|---|---|
| 6,084,250 | A * | 7/2000 | Justel et al. | 257/89 |
| RE37,878 | E * | 10/2002 | Bidiville et al. | 345/165 |
| 6,633,301 | B1 | 10/2003 | Dallas et al. | |
| 7,026,769 | B2 | 4/2006 | Lee et al. | |
| 2002/0047624 | A1 | 4/2002 | Stam et al. | |
| 2006/0000963 | A1 * | 1/2006 | Ng et al. | 250/205 |
| 2007/0159831 | A1 * | 7/2007 | Faller | 362/311 |
| 2007/0268696 | A1 | 11/2007 | Scordino | |

FOREIGN PATENT DOCUMENTS

| | | | |
|---|---|---|---|
| DE | 196 40 671 | C1 | 5/1998 |
| DE | 10 2004 050 889 | A1 | 7/2005 |
| DE | 10 2007 014 475 | A1 | 5/2008 |
| GB | 2 409 291 | A | 6/2005 |
| WO | 03/053111 | A1 | 6/2003 |

OTHER PUBLICATIONS

Labsphere, "Spectralon® Diffuse Reflectance Standards," www.labsphere.com (2 pgs. Datasheet).

* cited by examiner

*Primary Examiner* — Douglas W Owens
*Assistant Examiner* — Dedei K Hammond

(57) ABSTRACT

An illumination device is specified which includes a radiation source having at least one light-emitting diode, a control unit and a radiation receiving unit. The radiation receiving unit is provided, during operation of the illumination device for receiving both a radiation emitted by the radiation source and a reference radiation and for generating a measurement signal upon receiving the radiation from the radiation source and a reference signal upon receiving the reference radiation. An operating point for the radiation source is tunable by the control unit in a manner dependent on the measurement signal and the reference signal. Furthermore, a method is specified by which an emission characteristic of an illumination device can be adapted to a predetermined emission characteristic in a simplified manner.

47 Claims, 3 Drawing Sheets

Figure 1:
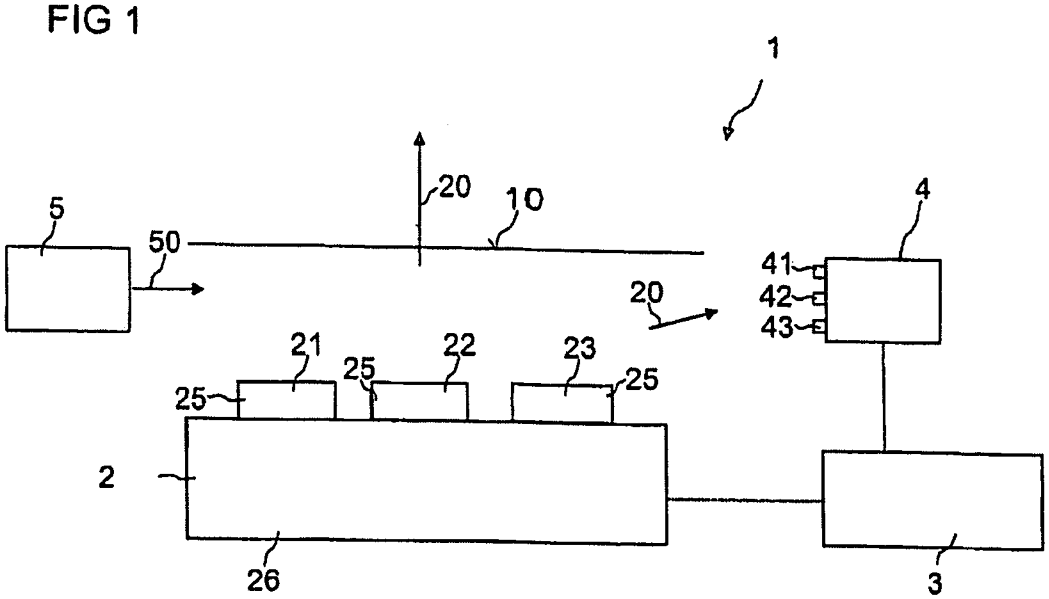

ILLUMINATION DEVICE AND METHOD FOR ADAPTING AN EMISSION CHARACTERISTIC OF AN ILLUMINATION DEVICE

The present application relates to an illumination device and to a method for adapting an emission characteristic of an illumination device to a predetermined emission characteristic.

This patent application claims the priority of German patent application 10 2007 040 873.2, the disclosure content of which is hereby incorporated by reference.

The emission characteristic, in particular the color locus, of conventional illumination devices is often subjected to undesirable alterations. The cause thereof may be, for example, temperature changes during operation of the illumination device or else aging-dictated degradation effects.

One object is to specify an illumination device whose emission characteristic can be adapted to a predetermined emission characteristic in a simplified manner. Furthermore, the intention is to specify a method by which an emission characteristic of an illumination device can be adapted to a predetermined emission characteristic in a simplified manner.

These objects are achieved by means of the subject matters of the independent patent claims. The dependent patent claims relate to advantageous configurations and expediencies.

In accordance with one embodiment, an illumination device comprises a radiation source having at least one light-emitting diode, a control unit and a radiation receiving unit. The radiation receiving unit is provided, during operation of the illumination device for receiving both a radiation emitted by the radiation source and a reference radiation and for generating a measurement signal upon receiving the radiation from the radiation source and a reference signal upon receiving the reference radiation. An operating point for the radiation source can be set by means of the control unit in a manner dependent on the measurement signal and the reference signal.

For setting the operating point therefore, the reference radiation can be used in addition to the radiation from the radiation source. Reliable adaptation of an emission characteristic of the illumination device to a predetermined emission characteristic is thus simplified.

In accordance with one embodiment for a method for adapting an emission characteristic of an illumination device to a predetermined emission characteristic, a radiation from a radiation source of the illumination device is received by means of a radiation receiving unit and a measurement signal is generated. The measurement signal is fed to a control unit of the radiation source. A reference radiation is received by means of the radiation receiving unit and a reference signal is generated. The reference signal is fed to the control unit. An operating point for the radiation source is set by means of the control unit in a manner dependent on the measurement signal and the reference signal. On the basis of the reference signal and the measurement signal, the emission characteristic of the illumination device can be adapted to the predetermined emission characteristic in a simple manner.

It goes without saying that the method steps described can also be carried out in an order that deviates from the enumeration order.

The illumination device described is particularly suitable for carrying out the method described. Features described in connection with the illumination device therefore can also be used for the method, and vice versa.

The reference radiation is preferably generated in the illumination device during operation of the illumination device. Consequently, the reference radiation can be generated largely independently of external influences.

Furthermore, the reference radiation is preferably generated in such a way that an aging-dictated alteration of the emission properties of the reference radiation is smaller than an aging-dictated alteration of the emission properties of the radiation source.

Both the radiation from the radiation source and the reference radiation can be received by means of the radiation receiving unit. In particular, the radiation receiving unit can have at least one radiation receiver on which the radiation from the radiation source and also the reference radiation impinge. The measurement signal and the reference signal therefore can be generated by means of the same radiation receiving unit, in particular by means of the same radiation receiver or radiation receivers.

In one preferred configuration the sensitivity of the radiation receiving unit is calibrated by means of the reference radiation. In particular, in the case of a radiation receiving unit having a plurality of radiation receivers, the individual radiation receivers can be calibrated. By way of example, the sensitivity of the radiation receiving unit can be determined in this way.

As a measure of the sensitivity of the radiation receiving unit or of the respective radiation receiver it is possible to use, in particular, the spectral sensitivity distribution, that is to say the responsivity (ratio of generated signal to the impinging radiation power) as a function of the wavelength of the impinging radiation, or the integral responsivity, that is to say the ratio of the signal generated in a predetermined spectral range to the radiation power impinging in said spectral range.

In one preferred configuration, a change in the sensitivity of the radiation receiving unit, for instance on account of aging of the radiation receiving unit and/or a change in temperature of the radiation receiving unit is monitored by means of the reference radiation. A change in the measurement signal and/or in the reference signal that is caused by the radiation receiving unit can be taken into account or compensated for in this way when setting the operating point for the radiation source. By means of the reference radiation it is therefore possible to distinguish whether a change in the measurement signal is caused by an alternation of the properties of the radiation source or a change in the properties of the radiation receiving unit. The emission characteristic of the illumination device, in particular the color locus, can thus be adapted to the predetermined emission characteristic in a simple manner, preferably over the entire lifetime of the illumination device.

An operating point is understood to be, in particular, a value or a range of values for an operating parameter or values or ranges of values for a set of operating parameters which can influence crucially the emission characteristic of the illumination device. In particular, the operating parameters can be electrical parameters such as an operating voltage or an operating current for the radiation source or for a channel of the radiation source. Furthermore, at least one operating parameter can be, for example, a thermal parameter such as, for instance, an operating temperature of the radiation source.

In one preferred configuration, the operating point for the radiation source is determined from the measurement signal and the reference signal by means of an arithmetic operation, for instance by means of difference formation.

Furthermore, the operating point can be set by means of the control unit in such a way that a change in the emission characteristic, for instance in the color locus, that is induced by a change in temperature of the radiation source is at least partly compensated for. An undesirable change in the emission characteristic during operation of the illumination device can be avoided or at least reduced in this way.

Furthermore, the operating point can be set by means of the control unit in such a way that a change in the emission characteristic that is induced by an aging of the radiation source is at least partly compensated for. In this way, an emission characteristic that remains largely constant can be achieved in a simplified manner over the lifetime of the illumination device.

In one preferred configuration, a color locus of the radiation from the radiation source can be set by means of the control unit. In order to determine the color locus it is possible to use a system of coordinates that are suitable for representing colors, in particular a standard chromaticity diagram from the International Commission on Illumination (CIE, Commission Internationale de l'Eclairage), for instance the standard chromaticity diagrams CIE 1931 or CIE 1964.

In one preferred configuration, the radiation source has at least two radiation emitters which can be driven separately by the control unit. These radiation emitters can emit radiation in mutually different spectral ranges. By way of example, the radiation emitters can be formed in such a way that mixed-colored light, in particular light that appears white to the human eye, can be generated by means of the light-emitting diodes respectively assigned to the radiation emitters.

In one configuration variant, the color locus of the radiation from the radiation source is different from a color locus of the reference radiation in a targeted manner. The color locus of the reference radiation can therefore be different from a predetermined color locus for the radiation from the radiation source.

In particular, the reference radiation can be provided for calibrating the radiation receiving unit. Proceeding from a reference signal calibrated in this way, a color locus predetermined for the illumination device, in particular in a range around the color locus of the reference radiation, can be reliably set in a simplified manner.

In an alternative configuration variant, the color locus of the radiation from the radiation source corresponds to the color locus of the reference radiation. The predetermined color locus of the radiation from the radiation source can therefore be predetermined by the reference radiation. In this case, the operating point for the radiation source can be determined on the basis of a simple arithmetic operation, for instance by means of forming a difference between the measurement signal and the reference signal.

In one preferred configuration, the illumination device has an electrically operable reference radiation source provided for generating the reference radiation. In contrast to the radiation source, the reference radiation source is not necessarily provided for increasing the radiation power emitted by the illumination device. Accordingly, the reference radiation source can also be formed and/or arranged in such a way that radiation emitted by the reference radiation source does not emerge or emerges only in a small proportion from the illumination device.

The reference radiation source can have, for example an incandescent lamp or a gas discharge lamp. Alternatively or supplementarily, the reference radiation source can have an optoelectronic semiconductor component, for instance a light-emitting diode.

In one preferred development, the reference radiation source is nominally provided for operation with a rated power and is furthermore preferably operable below the rated power.

In particular, the reference radiation source can be operated with at most 80% of the rated power, particularly preferably with at most 50% of the rated power. A reference radiation source operated below the rated power can be distinguished by a small degree of aging, particularly in comparison with the light-emitting diodes of the radiation source. By means of a reference radiation source of this type, the radiation receiving unit can be calibrated in a simple manner.

Alternatively or supplementarily, the reference radiation source can be operated for a shorter time than the radiation source during operation of the illumination device. The aging of the reference radiation source thus can be reduced in comparison with the aging of the radiation source.

Furthermore, an operating parameter for the reference radiation source, for instance an operating current, can be stabilized to a predetermined value. The reference radiation source can thus be operated highly reproducibly.

The illumination device expediently has a radiation exit surface, through which radiation generated by the radiation source during operation of the illumination device passes.

The reference radiation source is preferably arranged outside an optical beam path from the radiation source to the radiation exit surface. A shading of the radiation exit surface by the reference radiation source can thus be avoided.

In one preferred configuration, the color locus of the radiation generated by the radiation source can be determined by means of the radiation receiving unit.

In one configuration variant, the radiation receiving unit has a radiation receiver which is sensitive over the visible spectral range.

In an alternative configuration variant, the radiation receiving unit can also have more than one radiation receiver. In particular, the radiation receiving unit can have a respective radiation receiver for at least two mutually different spectral ranges. By way of example, the radiation receiving unit can have three radiation receivers having a spectral sensitivity maximum in the red, green and blue spectral range, respectively. The spectral components and therefore the color locus of the radiation emitted by the radiation source and of the reference radiation can thus be determined in a simple manner.

The different radiation receivers of the radiation receiving unit can be formed by means of radiation receivers which are formed in discrete fashion, in particular which are spaced apart from one another.

Alternatively, the radiation receiving unit can also be formed by means of radiation receivers which are formed in monolithically integrated fashion, in particular which are arranged one above another. Radiation receivers of this type can be distinguished in particular by a compact design.

Preferably, at least one radiation receiver is embodied as a photodiode.

The radiation emitters can be operated simultaneously for determining the color locus of the radiation source. This is expedient in particular if the radiation receiving unit has in each case at least one radiation receiver for mutually different spectral ranges, for instance, for the red, green and blue spectral ranges.

Alternatively, the radiation emitters of the radiation source can also be operated successively for determining the color locus of the radiation source. In this case, the color locus of the radiation source can be determined from the measurement of the intensities of the individual radiation emitters. A plurality of radiation emitters having a detection maximum in different spectral ranges can be dispensed with in this case.

In one preferred configuration, the illumination device has a phosphorescent material provided for generating the reference radiation. The reference radiation can therefore be generated by means of the phosphorescent material.

Reference radiation generated by means of a phosphorescent material can be distinguished in particular by the fact that the color locus of the reference radiation has a comparatively small change in the event of a change in the temperature of the phosphorescent material. Changes in the color locus on account of aging effects can also be small in the case of phosphorescent material compared with changes in the color locus of light-emitting diodes. Reference radiation generated in this way is therefore particularly suitable for calibrating the radiation receiving unit. Furthermore, the spectrum of phosphorescent material, in particular compared with incandescent lamps or light-emitting diodes, can have particularly small changes between different production batches, whereby the reference radiation can be generated reliably in a simplified manner.

The phosphorescent material can be optically or electrically excited during operation of the illumination device. In particular, phosphorescent material referred to as self-luminous can also be employed.

The phosphorescent material can contain for example an oxide, a sulfide, for instance zinc sulfide and/or cadmium sulfide, a selenide or a halide. A silicate, which can contain, for example zinc, cadmium, manganese, aluminum, silicon or a rare earth metal can also be employed.

Furthermore, the phosphorescent material can contain an activator that can be provided for extending the time duration of the persistence. By way of example, a metal, for instance Al, Cu, Au or Ag, is suitable as activator.

In particular the phosphorescent material can contain yttrium aluminum garnet (YAG). Furthermore, the yttrium-aluminum garnet can be doped with a rare earth element, for instance Ce.

The reference radiation can be generated in particular by means of the persistence of the phosphorescent material. The reference radiation can therefore be generated at a point in time at which the excitation, for instance the optical excitation by means of the reference radiation source or the radiation source of the phosphorescent material has already been switched off. In other words, the excitation of the phosphorescent material and the generation of the reference signal can take place successively.

The phosphorescent material can be arranged and formed in such a way that it can be optically excited by means of the radiation source. In this case, therefore, the reference radiation can be generated without an additional electrically operable reference radiation source being required for this purpose.

Alternatively, the phosphorescent material can be arranged and formed in such a way that it can be excited independently of the radiation source. In particular, the phosphorescent material can be optically excited by the reference radiation source. An excitation of the phosphorescent material and therefore a generation of the reference radiation can thus take place independently of the operation of the radiation source.

In one configuration variant, the phosphorescent material is integrated into the radiation source. In particular, the phosphorescent material can be part of a conversion material of the radiation source that is provided for generating the radiation emitted by the radiation source. Additional phosphorescent material can thus be dispensed with.

In an alternative configuration variant, the phosphorescent material is formed separately from the radiation source. In this case, the phosphorescent material can be chosen in a suitable manner for the generation of the reference radiation independently of the radiation source.

In one preferred configuration the illumination device has a reflective surface, wherein radiation emitted by the radiation source can be directed through the radiation exit surface at least partly by means of said reflective surface. Preferably, the reflective surface has a reflectivity for radiation generated by the radiation source of at least 70%, particularly preferably at least 80%, most preferably at least 90%.

Furthermore, the reflective surface can be provided for intermixing the radiation from individual light-emitting diodes of the radiation source. By way of example, the reflective surface can be formed in diffusely reflective fashion.

In a further preferred development, the reflective surface is formed by means of a volume-scattering material. In particular, the reflective surface can contain a porous material that brings about a highly diffuse reflection. By way of example, the material sold under the designation "Spectralon" (Labsphere Inc.) is suitable.

In a further preferred configuration, the reflective surface is embodied such that it is partly transparent to radiation emitted by the radiation source.

In this case, the radiation receiving unit can be arranged on that side of the reflective surface remote from the radiation exit surface. A shading of the radiation exit surface by the radiation receiving unit can be avoided in this way.

In one preferred configuration, the measurement signal and/or the reference signal can be stored, for instance in the control unit. In this way, the operating point can be set without the measurement signal and the reference signal in each case having to be generated.

Preferably, the reference signal is generated in a predetermined operating state. Constant operating conditions during the generation of the reference signal can thus be obtained in a simplified manner. By way of example, the reference signal can be generated and stored in each case when the illumination device is switched on. During the operation of the illumination device, this stored reference signal, in particular together with a respectively updated measurement signal can be used for determining the operating point.

Further features, advantageous configurations and expediencies will become apparent from the following description of the exemplary embodiments in conjunction with the figures.

Figure 2:
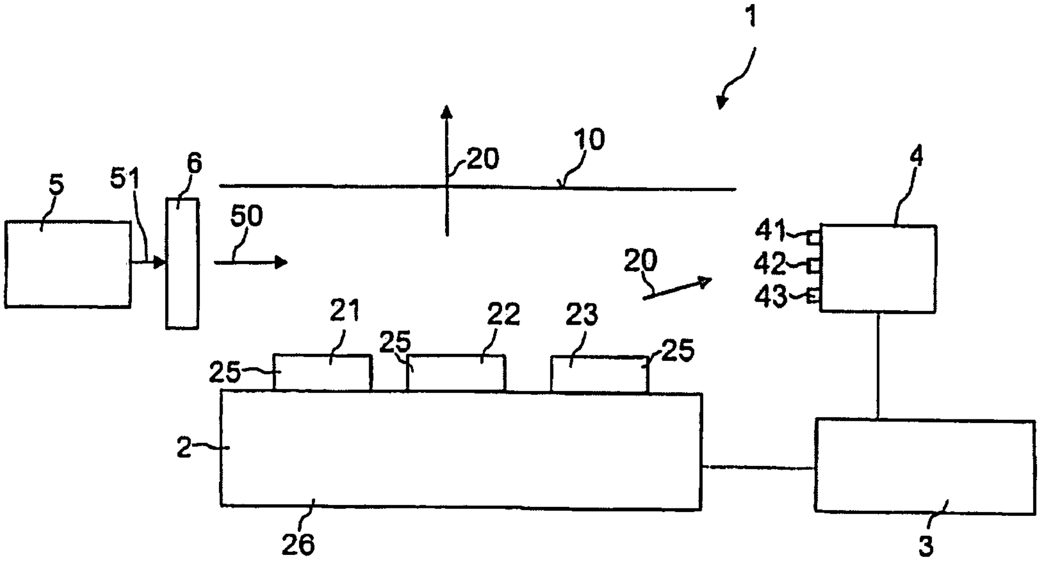
Figure 3:
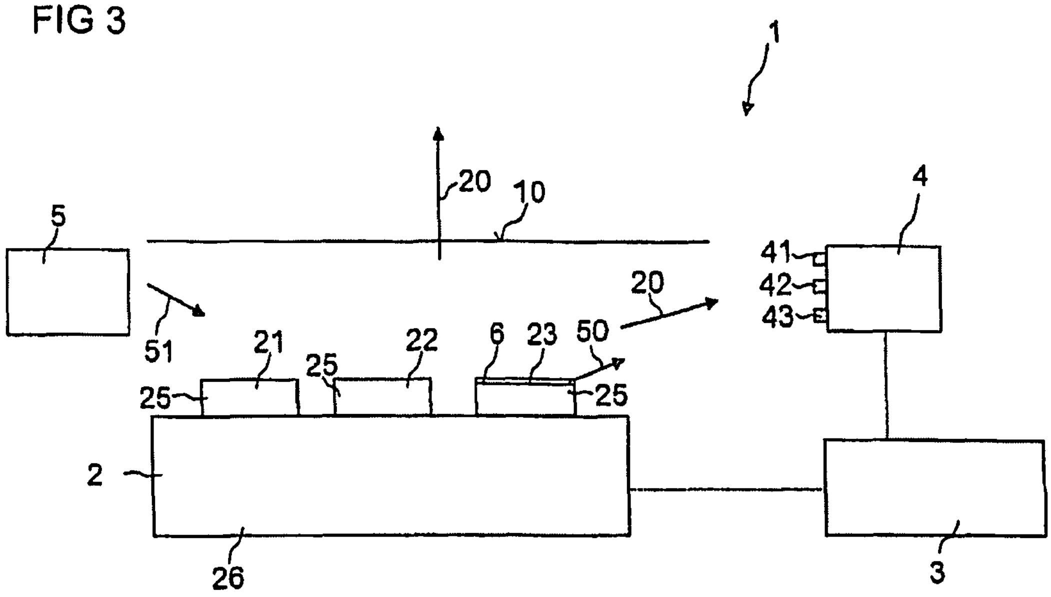
Figure 4:
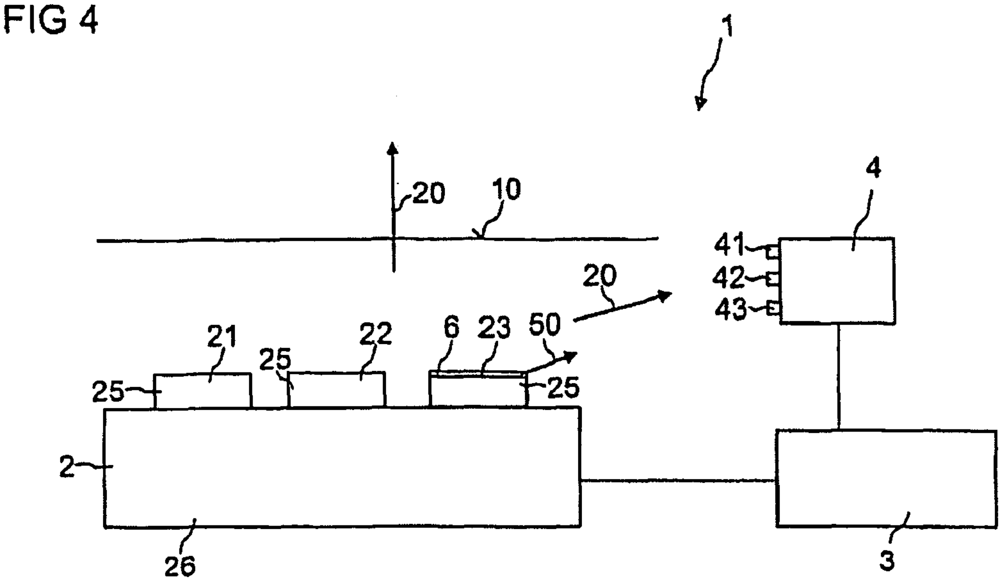
Figure 5:
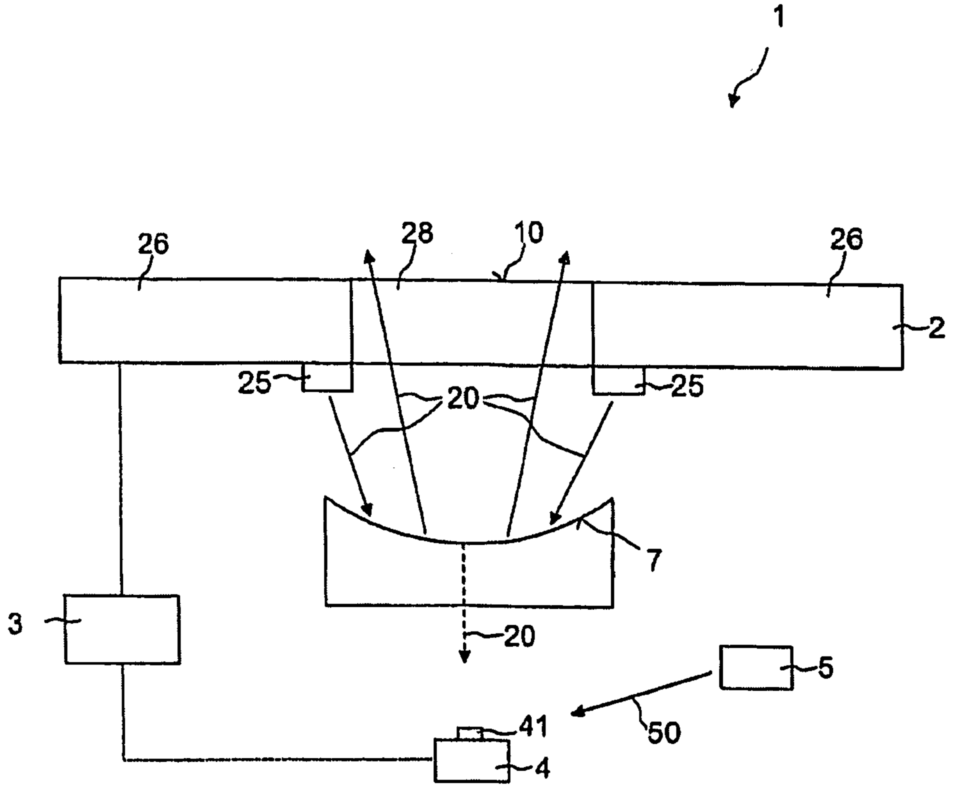

In the figures:

FIG. 1 shows a first exemplary embodiment of an illumination device on the basis of a schematic side view, FIG. 2 shows a second exemplary embodiment of an illumination device on the basis of a schematic side view, FIG. 3 shows a third exemplary embodiment of an illumination device on the basis of a schematic side view, FIG. 4 shows a fourth exemplary embodiment of an illumination device on the basis of a schematic side view, and FIG. 5 shows a fifth exemplary embodiment of an illumination device on the basis of a schematic sectional view.

Elements which are identical, of identical type and act identically are provided with identical reference symbols in the figures.

The figures are in each case schematic illustrations and therefore not necessarily true to scale. Rather, comparatively small elements may be illustrated with an exaggerated size for clarification purposes.

A first exemplary embodiment of an illumination device 1 is schematically illustrated in a side view in FIG. 1. The illumination device 1 comprises a radiation source 2 having a plurality of light-emitting diodes 25.

The light-emitting diodes 25 preferably each comprise at least one semiconductor body having at least one active region provided for generating radiation. The light-emitting diodes can be embodied as unpackaged semiconductor chips or as components each having at least one semiconductor chip integrated therein. In this case, the light-emitting diodes can be formed for example in a radial design or as surface mountable components (SMD, surface mounted device).

The radiation source has a first radiation emitter 21, a second radiation emitter 22, and a third radiation emitter 23. In a departure from this, it is also possible to provide a number of radiation emitters that deviates from three, for instance, one radiation emitter, two radiation emitters or more than three radiation emitters. Furthermore, merely by way of example, each radiation emitter is assigned one light-emitting diode 25. It goes without saying that each radiation emitter can also be assigned more than one light-emitting diode. The light-emitting diodes of different radiation emitters preferably emit radiation in different ranges of the electromagnetic spectrum. By way of example, the radiation emitters 21, 22, 23 can emit radiation in the red, green and blue spectral range, respectively. By controlling the intensities of the radiation emitted by the radiation emitters, it is possible to set the color locus of the radiation 20 emitted by the radiation source 2 over wide ranges.

At least one of the light-emitting diodes, in particular the active region, preferably contains a III-V semiconductor material.

III-V semiconductor materials are particularly suitable for generating radiation in the ultraviolet ($In_xGa_yAl_{1-x-y}N$) through the visible ($In_xGa_yAl_{1-x-y}N$ in particular for blue to green radiation, or $In_xGa_yAl_{1-x-y}P$ in particular for yellow to red radiation) to the infrared ($In_xGa_yAl_{1-x-y}As$) spectral range. In this case, $0 \leqq x \leqq 1$, $0 \leqq y \leqq 1$ and $x+y \leqq 1$, respectively hold true, in particular where $x \neq 1$, $y \neq 1$, $x \neq 0$ and/or $y \neq 0$. With III-V semiconductor materials, in particular from the material systems mentioned, advantageously high internal quantum efficiencies can furthermore be obtained during the generation of radiation.

The light-emitting diodes 25 are preferably arranged on a carrier 26 and furthermore preferably fixed to the latter. The carrier 26 can be embodied for example, as a printed circuit board (PCB).

Furthermore, the illumination device 1 comprises a radiation receiving unit 4. The radiation receiving unit 4 has by way of example a first radiation receiver 41, a second radiation receiver 42 and a third radiation receiver 43. The radiation receivers preferably have in each case mutually different detection ranges, for example in the red, green and blue spectral ranges. In this way, the color locus of a radiation impinging on the radiation receiving unit 4, that is to say in particular of the radiation from the radiation source or the reference radiation can be determined in a simplified manner.

The radiation receivers 41, 42, 43 can be formed as discrete components which can be arranged alongside one another, for example. By way of example, the radiation receivers can be photodiodes which can be based, for example on silicon. The spectral sensitivity of the photodiodes can be adapted by means of optical filters connected upstream (not explicitly illustrated), for example, to a spectral sensitivity distribution that is respectively predetermined for the radiation receivers.

Alternatively, the photodiodes can also be based on III-V semiconductor material wherein the spectral sensitivity ranges can be set in each case by means of the band gap of the semiconductor materials used.

As an alternative to discrete radiation receivers, the radiation receiving unit 4 can also be formed by means of radiation receivers formed in monolithically integrated fashion. In particular, the radiation receivers can be arranged one above another.

During operation of the illumination device 1, the radiation receiving unit 4 is provided for receiving both a radiation 20 emitted by the radiation source and a reference radiation 50. The radiation from the radiation source and the reference radiation therefore impinge on the same radiation receivers.

Furthermore, the illumination device has a control unit 3. The control unit can be arranged on the carrier 26, for example. During operation of the illumination device, the radiation receiving unit 4 feeds to the control unit 3 a measurement signal upon receiving the radiation from the radiation source 2 and a reference signal upon receiving the reference radiation 50. An operating point for the radiation source 2 can be set by means of the control unit 3 in a manner dependent on the measurement signal and the reference signal. By way of example, a color locus of the radiation from the radiation source can be set by adapting the operating currents for the radiation emitters 21, 22, 23.

The reference radiation 50 is preferably generated within the illumination device. In the first exemplary embodiment illustrated in FIG. 1, the reference radiation is generated by means of a reference radiation source 5. The reference radiation source 5 can be, for example, an incandescent lamp or a gas discharge lamp. Alternatively, or supplementarily, the reference radiation source can also have a semiconductor component, for instance a light-emitting diode.

Preferably, the reference radiation source 5 is arranged outside a beam path from the radiation source to a radiation exit surface 10 of the illumination device 1. A shading of the radiation exit surface by the reference radiation source 5 can thus be avoided.

In order to adapt an emission characteristic of the illumination device to a predetermined emission characteristic, the radiation emitted by the radiation source can be received by the radiation receiving unit 4 and a measurement signal can be generated. Said measurement signal can be fed to the control unit 3 for the radiation source 2. The signal paths are indicated in a greatly simplified manner by means of dotted lines in FIG. 1.

Furthermore, a reference signal can be generated upon reception of the reference radiation by means of the radiation receiving unit 4. Said reference signal is likewise fed to the control unit 3. The order in which the reference radiation and the radiation from the radiation source are received and the corresponding measurement signals and reference signals respectively are fed to the control unit is largely freely selectable.

Preferably, the sensitivity of the radiation receiving unit is calibrated by means of the reference radiation. In this case, the individual sensitivities of the radiation receivers 41, 42, 43 can be determined successively or simultaneously.

The reference radiation is preferably generated during a predetermined operating state of the illumination device and the corresponding reference signal is furthermore preferably stored. By way of example, the reference radiation can be generated in each case when the illumination device is switched on.

Preferably, a change in the sensitivity of the radiation receiving unit 4 on account of aging of the radiation receiving unit and/or on account of a change in temperature of the radiation receiving unit is monitored by means of the reference radiation. A change in the reference signal that is caused by such effects can thus be taken into account when setting the operating point for the radiation source. In this way, by way of example, the color locus of the radiation generated by the radiation source can be determined particularly reliably and, if necessary, it is possible to adapt the operating point for obtaining a predetermined color locus.

For this purpose, by way of example, the radiation emitters 21, 22, 23 of the radiation source 2 can be driven separately from one another by the control unit 3.

The reference radiation 50 is preferably generated in such a way that an aging-dictated alteration of the emission properties of the reference radiation is smaller than an aging-dictated alteration of the emission properties of the radiation source 2.

By way of example, the reference radiation source 5 can be operated below the rated power thereof, preferably with at most 80% of the rated power, particularly preferably with at most 50% of the rated power. An aging of the reference radiation source is thus reduced.

Alternatively or supplementarily the reference radiation source 5 can be operated for a shorter time than the radiation source 2 during operation of the illumination device 1. The reference signal is preferably generated while the radiation source 2 is switched off. An undesired superimposition of the radiation from the radiation source 2 with the reference radiation 50 can be avoided in this way.

Furthermore, an operating parameter, for instance the operating current or the operating voltage, for the reference radiation source 5 can be stabilized to a predetermined value for improved reproducibility.

By means of the reference radiation 50 a change in the sensitivity of the radiation receiving unit 4 can be taken into account in a simple manner. The color locus of the radiation from the radiation source can thus be set to a predetermined value in a simplified manner. Such a predetermined value can correspond to the color locus of the reference radiation 50. In this case the operating point of the radiation source 2 can be set in such a way that the measurement signal corresponds to the reference signal or at least comes as close as possible to said reference signal.

In a departure from this, the color locus of the radiation from the radiation source can be different from a color locus of the reference radiation in a targeted manner. In this case therefore, the reference radiation serves predominantly for calibrating the radiation receiving unit 4. On the basis of the calibrated reference signal, virtually any desired color locus in a suitable system of coordinates, for instance a CIE standard chromaticity diagram, can be reliably set in a simple manner.

The operating point for the radiation source 2 is preferably determined from the measurement signal and the reference signal by means of an arithmetic operation. In the simplest case, such an arithmetic operation can consist of forming the difference between the measurement signal and the reference signal. If necessary, a plurality of arithmetic operations can also be expedient, in particular for setting a color locus that is different from the color locus of the reference radiation 50.

Furthermore, the operating point is preferably set by means of the control unit 3 in such a way that a change in the emission characteristic that is induced by a change in temperature of the radiation source 2 is at least partly compensated for. In particular, changes in the measurement signal on account of changes in the sensitivity of the radiation receiving unit 4 can be taken into account in this case by using the reference signal or the stored reference signal. The actually required adaptation of the operating point can thus be achieved particularly reliably.

Furthermore, the operating point can be set by means of the control unit 3 in such a way that a change in the emission characteristic that is induced by an aging of the radiation source 2 is at least partly compensated for. A change in the measurement signal on account of an aging-dictated change in the sensitivity of the radiation receiving unit 4 can be taken into account in this case by a regular calibration of the radiation receiving unit 4 by means of the reference radiation 50. The actually required adaptation of the operating point of the radiation source 2 can thus be effected reliably.

A second exemplary embodiment of an illumination device is illustrated in schematic side view in FIG. 2. This second exemplary embodiment substantially corresponds to the first exemplary embodiment described in connection with FIG. 1. In contrast thereto, the reference radiation 50 is generated by means of a phosphorescent material 6. Preferably, the persistence of the phosphorescent material serves as reference radiation. The phosphorescent material is arranged in such a way that radiation emitted by the phosphorescent material impinges on the radiation receiving unit 4. The phosphorescent material 6 is excited for example by means of a radiation 51 emitted by the reference radiation source 5. In a departure from an optical excitation, the phosphorescent material can for example also be electrically excited. Furthermore, self-luminous phosphorescent materials can also be employed and be optically or electrically excited.

In particular the persistence of a phosphorescent material can be distinguished by a high stability of the color locus and is therefore particularly suitable as reference radiation for calibrating the sensitivity of the radiation receiving unit 4.

Therefore, the reference radiation used is preferably that radiation which the phosphorescent material emits after the, for example, optical excitation of the phosphorescent material has already been switched off.

The phosphorescent material can contain for example an oxide, a sulfide, for instance zinc sulfide and/or cadmium sulfide, a selenide or a halide. A silicate, which can contain, for example zinc, cadmium, manganese, aluminum, silicon or a rare earth metal can also be employed.

Furthermore, the phosphorescent material can contain an activator that can be provided for extending the time duration of the persistence. By way of example, a metal, for instance Al, Cu, Au or Ag, is suitable as activator.

In particular the phosphorescent material can contain yttrium aluminum garnet (YAG). Furthermore, the yttrium aluminum garnet can be doped with a rare earth element, for instance Ce.

A third exemplary embodiment of an illumination device is schematically illustrated in side view in FIG. 3. This third exemplary embodiment substantially corresponds to the second exemplary embodiment. In contrast thereto, the phosphorescent material 6 is integrated into the radiation source 2, in particular into a light-emitting diode 25. In this case, the phosphorescent material can therefore also make a contribution to the radiation from the radiation source during operation of the illumination device. Additional phosphorescent material 6 embodied separately from the radiation source 2 can therefore be dispensed with.

It goes without saying that it is also possible for a plurality of light-emitting diodes 25 or even all of the light-emitting diodes 25 to contain a phosphorescent material which also serves for generating the reference radiation 50.

A fourth exemplary embodiment of an illumination device is illustrated schematically in side view in FIG. 4. This fourth exemplary embodiment substantially corresponds to the third exemplary embodiment described in connection with FIG. 3. In contrast thereto, the phosphorescent material 6 is excited by means of the radiation source 2, in particular by means of the light-emitting diode 25, during operation of the illumination device 1. An additional electrically operable reference radiation source can therefore be dispensed with in this case.

In this case, too, the reference radiation 50 is preferably measured while the radiation source 2, in particular the light-emitting diode 25 is switched off. Therefore, the reference radiation 50 is once again generated during the persistence of the phosphorescent material 6. In contrast thereto, the measurement signal is generated with the radiation source 2 switched on, that is to say with the light-emitting diode 25 switched on, and therefore comprises, in addition to the radiation emitted by the phosphorescent material, that radiation from the light-emitting diode 25 which is not absorbed by the phosphorescent material and emerges from the light-emitting diode 25.

A fifth exemplary embodiment of an illumination device is illustrated in schematic sectional view in FIG. 5. This fifth exemplary embodiment substantially corresponds to the first exemplary embodiment described in connection with FIG. 1.

In contrast thereto, the carrier 26 has a cutout 28, through which radiation generated by the radiation source 2 can pass. The cutout can be formed in a circular fashion, for example.

A radiation exit surface 10 of the illumination device is accordingly formed in the region of the cutout 28 of the carrier 26. Furthermore, the illumination device has a reflective surface 7 provided for deflecting radiation generated by the radiation source 2 in the direction of the radiation exit surface 10. The light-emitting diodes 25 are preferably arranged in a manner running around the cutout 28. Only two light-emitting diodes 25 are illustrated for the sake of improved clarity. Furthermore, the reflective surface 7 is preferably embodied in such a way that radiation 20 impinging on the reflective surface is intermixed, such that spectral radiation components emitted by the radiation source 2 are intermixed. Radiation emerging from the radiation exit surface 10 can have a color locus that is as uniform as possible in a lateral direction in this way.

The reflective surface 7 can be formed for example by means of a volume-scattering material. In particular, the reflective surface can contain a porous material that brings about a highly diffuse reflection.

The material sold under the designation "Spectralon" (Labsphere Inc.) is suitable, for example.

The reflective surface 7 furthermore preferably has a reflectivity of at least 70%, particularly preferably of at least 80%, most preferably of at least 90%, for the radiation generated by the radiation source 2.

The radiation receiving unit 4 is arranged on that side of the reflective surface 7 remote from the radiation exit surface 10. The reflective surface is expediently embodied such that it is partly transparent to radiation emitted by the radiation source 2, such that part of the radiation 20 can impinge on the radiation receiving unit 4.

The intensity of the reference radiation is preferably adapted to the intensity of the radiation which passes through the reflective surface and which impinges on the radiation receiving unit. In particular, at least the order of magnitude of the intensity of the reference radiation largely corresponds to the intensity—which is low compared with the total radiation power of the radiation source—of the radiation passing through the reflective surface. A calibration of the radiation receiving unit is thereby simplified.

In contrast to the first exemplary embodiment the radiation receiving unit 4 has precisely one radiation receiver 41, which preferably is sensitive over the, in particular entire, visible spectral range. In this case, the individual radiation emitters 21, 22, 23 can be operated successively for determining the color locus of the radiation source 2, such that the color locus can be determined from the corresponding intensity relations of the respective signals.

In a departure from this, the radiation receiving unit 4 can also have a plurality of radiation receivers 41 as described in connection with FIG. 1, such that the radiation receiving unit is suitable for determining the color locus of the radiation from the radiation source upon simultaneous irradiation by the radiation emitters of the radiation source 2. Furthermore, as described in connection with FIGS. 2 to 4, in the fifth exemplary embodiment, too, a phosphorescent material can be provided for generating the reference radiation 50 and be embodied in accordance with the previous exemplary embodiments.

The invention is not restricted by the description on the basis of the exemplary embodiments. Rather, the invention encompasses any new feature and also any combination of features which, in particular comprises any combination of features in the patent claims, even if this feature or this combination itself is not explicitly specified in the patent claims or the exemplary embodiments.

The invention claimed is:

1. An illumination device comprising a radiation source having at least one light-emitting diode;

a control unit; and a radiation receiving unit;

wherein the radiation receiving unit is provided, during operation of the illumination device for receiving both a radiation emitted by the radiation source and a reference radiation and for generating a measurement signal upon receiving the radiation from the radiation source and a reference signal upon receiving the reference radiation, and wherein an operating point for the radiation source is tunable by means of the control unit in a manner concurrently dependent on the measurement signal and the reference signal, wherein the measurement of the reference signal and the measurement signal take place at the same time.

2. The illumination device as claimed in claim 1, wherein a color locus of the radiation from the radiation source is tunable by means of the control unit.

3. The illumination device as claimed in claim 2, wherein the color locus of the radiation from the radiation source is different from a color locus of the reference radiation in a targeted manner.

4. The illumination device as claimed in claim 2, wherein the color locus of the radiation from the radiation source corresponds to a color locus of the reference radiation.

5. The illumination device as claimed in claim 1, which comprises an electrically operable reference radiation source provided for generating the reference radiation.

6. The illumination device as claimed in claim 5, wherein the reference radiation source is nominally provided for operation with a rated power and the reference radiation source is operable below the rated power.

7. The illumination device as claimed in claim 1, which has a radiation exit surface.

8. The illumination device as claimed in claim 7, wherein the reference radiation source is arranged outside an optical beam path from the radiation source to the radiation exit surface.

9. The illumination device as claimed in claim 8, wherein the reference radiation source comprises an incandescent lamp or a gas discharge lamp.

10. The illumination device as claimed in claim 8, wherein the reference radiation source comprises an optoelectronic semiconductor component.

11. The illumination device as claimed in claim 1, wherein the illumination device comprises a phosphorescent material provided for generating the reference radiation.

12. The illumination device as claimed in claim 11, wherein the phosphorescent material is excited during operation of the illumination device and the reference radiation is generated by means of the persistence of the phosphorescent material.

13. The illumination device as claimed in claim 11, wherein the phosphorescent material is arranged and formed in such a way that it can be optically excited by means of the radiation source.

14. The illumination device as claimed in claim 11, wherein the phosphorescent material is arranged and formed in such a way that it can be excited independently of the radiation source.

15. The illumination device as claimed in claim 5, wherein the illumination device comprises a phosphorescent material which is provided for generating the reference radiation and which can be optically excited by means of the reference radiation source.

16. The illumination device as claimed in claim 11, wherein the phosphorescent material is integrated into the radiation source.

17. The illumination device as claimed in claim 11, wherein the phosphorescent material is formed separately from the radiation source.

18. The illumination device as claimed in claim 7, wherein radiation emitted by the radiation source is directed through the radiation exit surface at least partly by means of a reflective surface.

19. The illumination device as claimed in claim 18, wherein the reflective surface is embodied such that it is partly transparent to radiation emitted by the radiation source.

20. The illumination device as claimed in claim 18, wherein the radiation receiving unit is arranged on that side of the reflective surface which is remote from the radiation exit surface.

21. The illumination device as claimed in claim 1, wherein the radiation receiving unit comprises a radiation receiver which is sensitive over the visible spectral range.

22. The illumination device as claimed in claim 1, wherein the radiation receiving unit comprises a respective radiation receiver for at least two mutually different spectral ranges.

23. The illumination device as claimed in claim 22, wherein the radiation receiving unit is formed by means of radiation receivers formed in discrete fashion.

24. The illumination device as claimed in claim 22, wherein the radiation receiving unit is formed by means of radiation receivers formed in monolithically integrated fashion.

25. A method for adapting an emission characteristic of an illumination device to a predetermined emission characteristic, comprising the following steps:

a) receiving a radiation from a radiation source of the illumination device by means of a radiation receiving unit and generating a measurement signal;
b) feeding the measurement signal to a control unit;
c) receiving a reference radiation by means of the radiation receiving unit and generating a reference signal;
d) feeding the reference signal to the control unit; and
e) setting an operating point for the radiation source by means of the control unit in a manner concurrently dependent on the measurement signal and the reference signal, wherein the measurement of the reference signal and the measurement signal take place at the same time.

26. The method as claimed in claim 25, wherein a sensitivity of the radiation receiving unit is calibrated by means of the reference radiation.

27. The method as claimed in claim 25, wherein a change in the sensitivity of the radiation receiving unit on account of at least one of aging of the radiation receiving unit or a change in temperature of the radiation receiving unit is monitored by means of the reference radiation.

28. The method as claimed in claim 25, wherein the color locus of the radiation generated by the radiation source is determined by means of the radiation receiving unit.

29. The method as claimed in claim 25, wherein the radiation source comprises at least two radiation emitters which are driven separately by the control unit.

30. The method as claimed in claim 29, wherein the radiation emitters emit radiation in mutually different spectral ranges.

31. The method as claimed in claim 29, wherein the radiation emitters are operated simultaneously for determining the color locus of the radiation source.

32. The method as claimed in claim 29, wherein the radiation emitters are operated successively for determining the color locus of the radiation source.

33. The method as claimed in claim 25, wherein the operating point for the radiation source is determined from the measurement signal and the reference signal by means of an arithmetic operation.

34. The method as claimed in claim 25, wherein the operating point is set by means of the control unit in such a way that a change in the emission characteristic that is induced by a change in temperature of the radiation source is at least partly compensated for.

35. The method as claimed in claim 25, wherein the operating point is set by means of the control unit in such a way that a change in the emission characteristic that is induced by aging of the radiation source is at least partly compensated for.

36. The method as claimed in claim 25, wherein the reference radiation is generated by means of a phosphorescent material.

37. The method as claimed in claim 36, wherein the phosphorescent material is excited and the reference radiation is generated by means of a persistence of the phosphorescent material.

38. The method as claimed in claim 36, wherein the phosphorescent material is optically excited.

39. The method as claimed in claim 36, wherein the phosphorescent material is excited by the radiation source.

40. The method as claimed in claim 29, wherein the reference signal is generated while the radiation source is switched off.

41. The method as claimed in claim 25, wherein the reference radiation is generated in such a way that an aging-dictated alteration of the emission properties of the reference radiation is smaller than aging-dictated alteration of the emission properties of the radiation source.

42. The method as claimed in claim 25, wherein the illumination device comprises a reference radiation source which is operated electrically.

43. The method as claimed in claim 42, wherein the reference radiation source is nominally provided for operation with a rated power and the reference radiation source is operated below the rated power.

44. The method as claimed in claim 42, wherein the reference radiation source is operated for a shorter time than the radiation source during operation of the illumination device.

45. The method as claimed in claim 36, wherein the illumination device comprises a reference radiation source which is operated electrically and wherein the phosphorescent material is excited by the reference radiation source.

46. The method as claimed in claim 25, wherein the measurement signal and/or the reference signal are stored in the control unit.

47. The method as claimed in claim 25, wherein the illumination device comprises a radiation source having at least one light-emitting diode;

a control unit; and a radiation receiving unit;

wherein the radiation receiving unit is provided, during operation of the illumination device for receiving both a radiation emitted by the radiation source and a reference radiation and for generating a measurement signal upon receiving the radiation from the radiation source and a reference signal upon receiving the reference radiation, and wherein an operating point for the radiation source is tunable by means of the control unit in a manner concurrently dependent on the measurement signal and the reference signal.

* * * * *